United States Patent

[11] 3,556,073

| [72] | Inventor | Langdon I. Garrison<br>Henniker, N.H. |
|---|---|---|
| [21] | Appl. No. | 724,195 |
| [22] | Filed | Apr. 25, 1968 |
| [45] | Patented | Jan. 19, 1971 |
| [73] | Assignee | The John Swenson Granite Co., Inc.<br>Concord, N.H.<br>a corporation of New Hampshire |

[54] SLOT-SAWING TOOL
5 Claims, 3 Drawing Figs.

[52] U.S. Cl. .................................................. 125/14,
51/170
[51] Int. Cl. .................................................. B28d 1/04,
B24b 23/00
[50] Field of Search .................................................. 125/13, 14;
51/170; 144/2.4, 134, 136; 143/43

[56] References Cited
UNITED STATES PATENTS

| 3,127,886 | 4/1964 | Miller | 125/13 |
| 2,587,994 | 3/1952 | Gregory | 144/136 |
| 1,463,303 | 7/1923 | Adair | 144/2 |

*Primary Examiner*—Harold D. Whitehead
*Attorney*—Kenway, Jenney & Hildreth

ABSTRACT: A portable, power operated, slot-sawing tool having a work engaging base with an upright post equipped with an adjustable carrier and a spindle assembly in offset relation to the carrier and provided with a rotary saw.

PATENTED JAN 19 1971

3,556,073

SHEET 2 OF 2

INVENTOR.
LANGDON I. GARRISON

SLOT-SAWING TOOL

This invention comprises a new and improved power-operated and portable tool for sawing slots, channels or reentrant angles in the face of a stone block or slab, as for example, in forming anchor slots at predetermined locations in an upright face of a finished granite panel.

In its preferred form the tool has a work-engaging base provided with a gauge face by which the tool may be located upon a block or panel with its saw precisely presented at the desired level in which the slot should be formed. The tool may then be bodily moved to bring the saw into operation and advanced in gauged relation to form a slot of the required depth.

An important feature of the tool resides in a saw-carrying spindle assembly which is mounted in offset relation to the base with provision for adjustment to locate the saw at the selected predetermined distance from the top surface of the panel upon which the tool is placed.

The base of the tool is provided with an upright post upon which is mounted a concentric carrier. The spindle assembly is disposed also in offset relation with respect to the carrier and has a rotary saw which is thus adjustable to gauged height with respect to the base of the machine. A driving motor is also mounted on the carrier with provision for transverse adjustment to correctly tension the driving belt to the spindle assembly.

The construction outlined imparts to the tool a very desirable sturdy and compact construction, adapting it for severe duty throughout a long life and convenience in handling by the operator.

Figure 1:
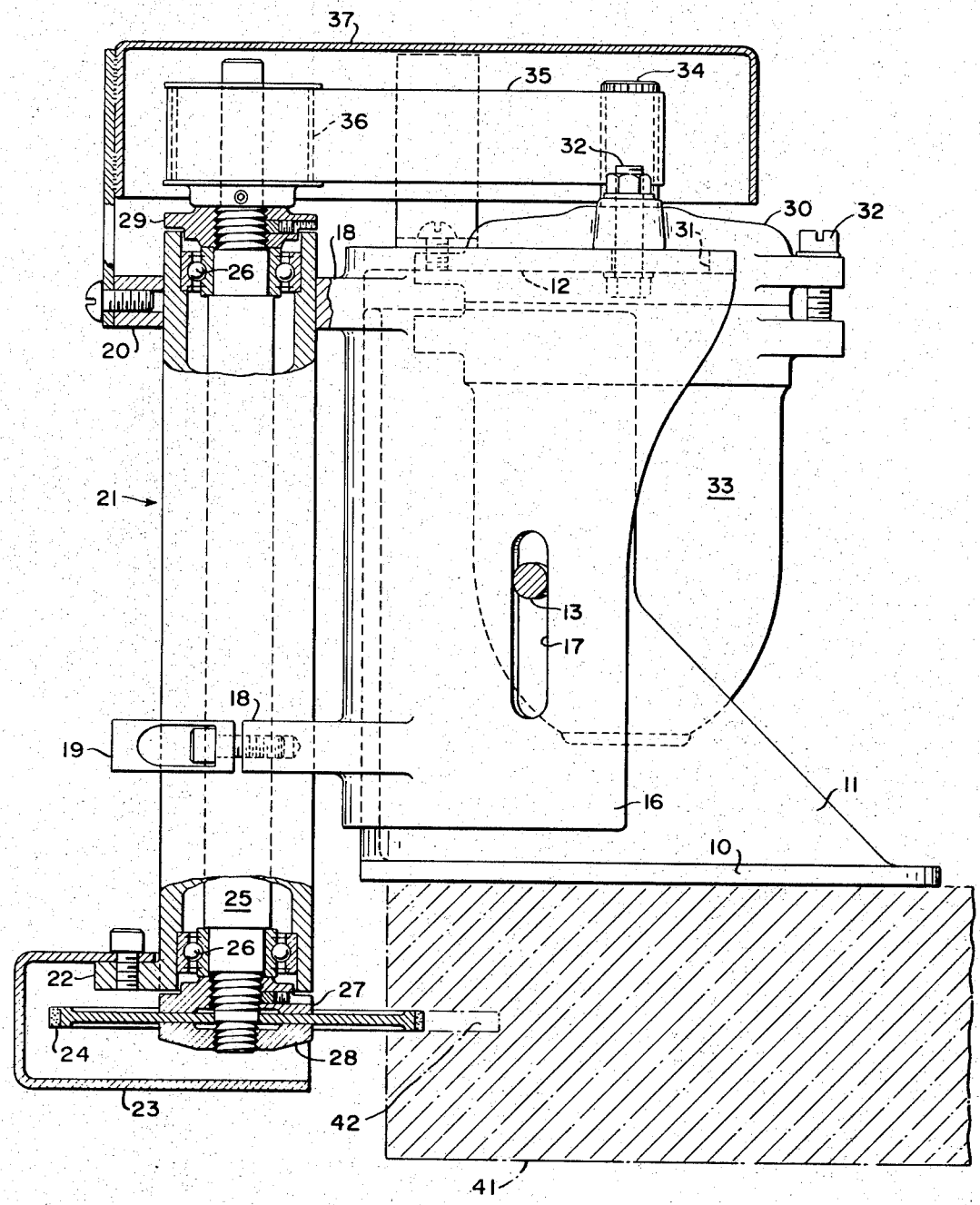
Figure 2:
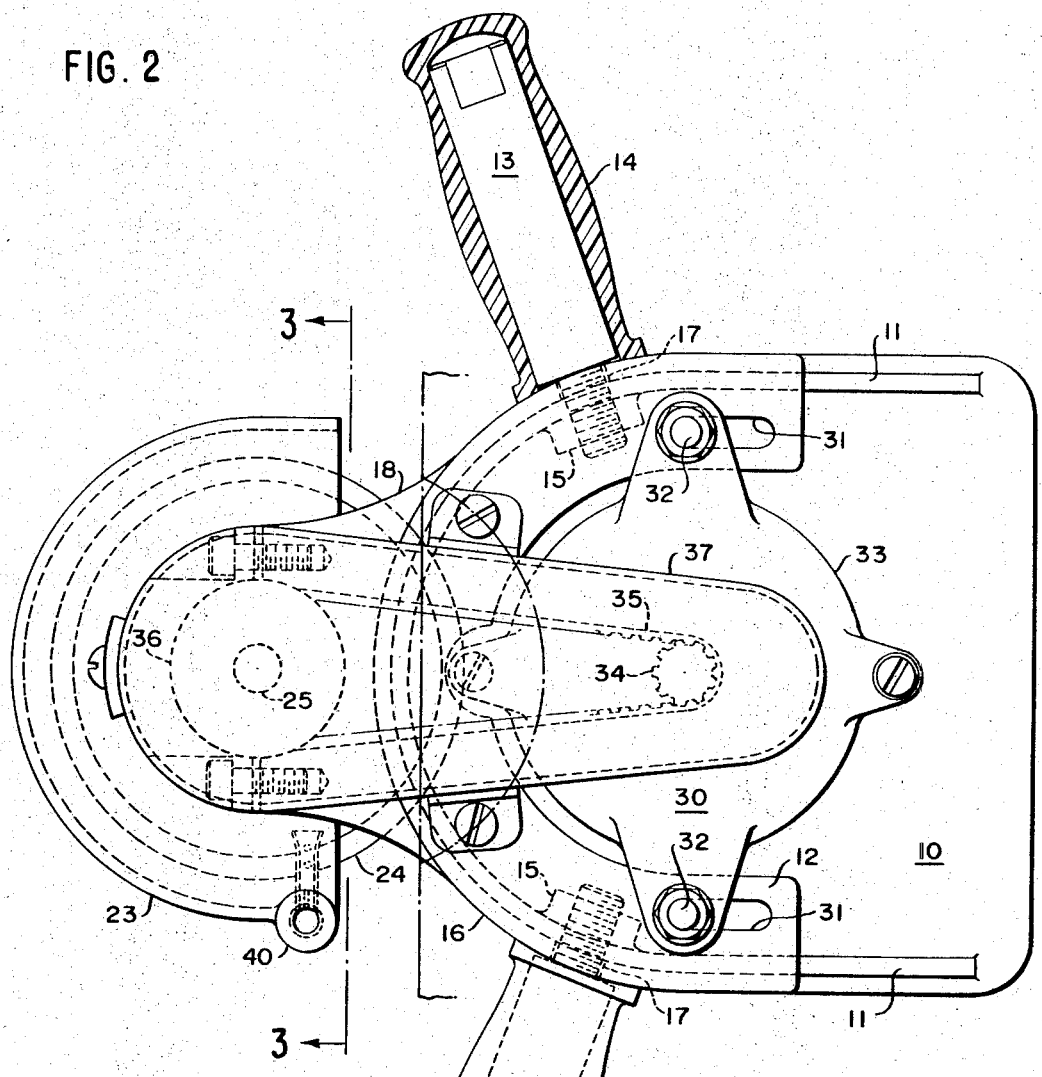
Figure 3:
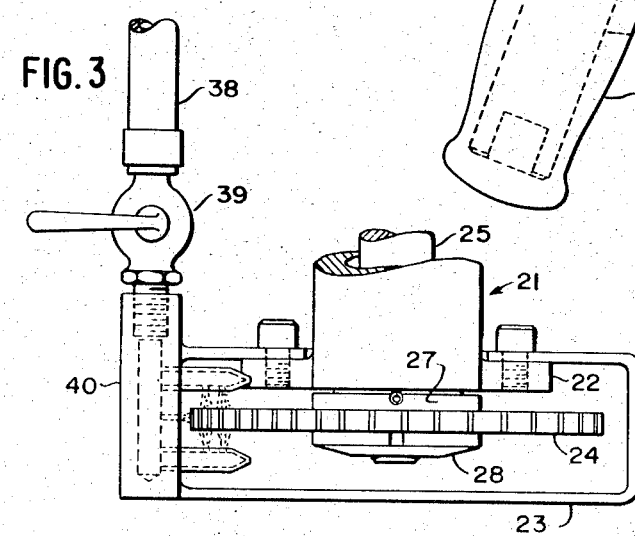

These and other features of the invention will be best understood and appreciated from the following description of a preferred embodiment thereof selected for purposes of illustration and shown in the accompanying drawings in which:

FIG. 1 is a view of the tool in side elevation showing portions broken away of the spindle assembly, FIG. 2 is a corresponding plan view, and FIG. 3 is a fragmentary view on the line 3—3 of FIG. 2.

The tool as herein shown comprises a base 10 having a flat work-engaging gauge face and merging upwardly into a fixed segmental post 11 open at its rear or concave side as shown in FIG. 2. The post 11 merges at its upper end into an inturned segmental flange 12.

Concentrically mounted on the post 11 is a segmental carrier 16 having parallel vertical slots 17 in its opposite sides for the passage of clamping bolts 13 enclosed in radially extending handles 14. These handles project from opposite sides of the post 11 in convenient position to be grasped in lifting or placing the whole tool in operative position. The bolts 13 are threaded into nuts 15 welded to the inner face of the post 11. The bolts 13 may be loosened to permit vertical adjustment of the carrier 16 on the post 11 and may be tightened to clamp the carrier in the desired adjusted position upon the post.

The segmental carrier 16 is provided on its upright convex face with a pair of brackets 18 having clamping yokes 19 and 20 for the vertical tube 21 of a spindle assembly which is thus clamped in offset relation to the carrier 16 and also to the base 10.

The tube 21 has a flange 22 at its lower end to which is bolted a housing 23 for a rotary saw 24. The saw is clamped to the lower end of a spindle 25 mounted in ball bearings 26 for rotation in the tube 21. The saw is clamped between flat nuts 27 and 28 upon the threaded lower end of the spindle 25.

At its upper end the saw spindle 25 carries a nut 29 and above this a driven pulley 36. The pulley 36 is connected by a belt 35 to a pinion 34 on the upper end of the motor shaft. The motor 33 is suspended within the open side of the post 11 by its head 30 having lugs which overlie the flange 12 of the post 11. This flange has slots 31 for bolts 32 thus providing for a transverse adjustment of the motor with respect to the saw spindle assembly to regulate the tension of the driving belt 35. A housing 37 enclosing these belt connections is mounted upon the upper bracket 18 of a spindle assembly.

The housing 23 of the saw is provided with inlet nozzles for cooling liquid directed toward the saw and connected through a manifold 40, tube 38 and valve 39 to a series of liquid supply. The tool is connected to a fluid source through the flexible tube 38 and has also flexible leads, not shown, to the motor 33. It is therefore portable in the sense that it may be freely manipulated in its presentation to the work. In FIG. 1 it is shown as located on a block 41 in position to form a slot 42.

The compact arrangement of the segmental post 11 and the correspondingly shaped carrier 16 together with the handles 14 result in a tool that is capable of convenient manufacture and presentation to stone blocks at any required angle.

I claim:

1. A power operated slot-sawing tool comprising a work-engaging base merging into a fixed segmental post, and a segmental carrier symmetrically mounted thereon, together with a motor partially enclosed within the open or concave side of the carrier and a spindle assembly mounted in offset relation to the fixed wall of the carrier.

2. A power operated slot-sawing tool as described in claim 1, comprising a work-engaging base merging into a segmental upright post which is open at its rear side and a carrier segmental in shape and mounted concentrically with respect to the closed side of the post and carries a motor, the spindle assembly being secured to the closed side of the carrier and being mounted for bodily transverse adjustment therewith with respect to the motor.

3. A power operated slot-sawing tool as described in claim 1, comprising a base plate formed with a fixed post segmental in cross section and having a convex upright wall, the post being provided with a carrier also segmental in cross section and symmetrically fitted upon the convex face of the fixed post and a spindle assembly mounted on the convex wall of the post in offset relation to the base of the tool.

4. A power operated slot-sawing tool as described in claim 1, wherein the fixed segmental post carries at its upper end an inturned flange and that the motor is supported upon this flange for bodily adjustment with respect to the saw spindle assembly.

5. A power operated slot-sawing tool as described in claim 1, in which lifting handles project divergently from convex external surfaces of the segmental post.